United States Patent [19]

Ohlschlager et al.

[11] 3,881,926

[45] May 6, 1975

[54] SENSITIZED ELECTROPHOTOGRAPHIC LAYERS WITH A POLYMETHINE SENTIZING DYE

[75] Inventors: Hans Ohlschlager, Cologne; Oskar Riester, Leverkusen, both of Germany; Theofiel Hubert Ghys, Kontich; Karel Eugeen Verhille, Hoboken; Johannes Josephus Vanheertum, Halle-Zand-Hoven, all of Belgium

[73] Assignee: Agfa-Gevaert Aktiengesellschaft, 509 Leverkusen-Bayerwerk, Germany

[22] Filed: Mar. 19, 1973

[21] Appl. No.: 342,872

[30] Foreign Application Priority Data
Mar. 23, 1972 Germany............................ 2214055

[52] U.S. Cl................................. 96/1.6; 96/1.7
[51] Int. Cl................................. G03g 5/08
[58] Field of Search...................... 96/1.6, 1.8, 1.5; 260/240 R, 240.5, 240.7, 240.9

[56] References Cited
UNITED STATES PATENTS

| 3,666,464 | 5/1972 | Keller | 96/1.6 |
| 3,782,933 | 1/1974 | Ohlschlager | 96/1.6 |

Primary Examiner—Ronald H. Smith
Assistant Examiner—John L. Goodrow
Attorney, Agent, or Firm—Connolly and Hutz

[57] ABSTRACT

Electrophotographic recording materials are spectrally sensitized with a polymethine sensitizing dye containing a cyano group or a nitro group in the $\alpha$- and/or $\gamma$-position of the methine chain.

2 Claims, No Drawings

SENSITIZED ELECTROPHOTOGRAPHIC LAYERS WITH A POLYMETHINE SENTIZING DYE

This invention relates to the spectral sensitization of electrophotographic recording materials, in particular of those which contain zinc oxide or organic photoconductors.

It is known that photoconductive layers, which usually have their characteristic sensitivity in the ultraviolet region of the spectrum, can be sensitized to visible light by the addition of dyes which transmit radiant energy. The dyes which have been proposed for this purpose belong to various classes of dyes, e.g., triphenylmethane dyes, phenolsulphonphthaleins, xanthene and acridine dyes and cyanines, merocyanines and oxonoles, which belong to the class of polymethine dyes.

However the known dyes have the disadvantage either of not causing sufficient increase in sensitivity or of excessively colouring the electrophotographic layer which is usually required to be colourless or at least almost colourless. Discoloration of the layer is a particularly serious disadvantages in electrophotographic materials because the sensitizing dyes used cannot be washed out by the usual methods of processing nor can they be destroyed by baths. Bleaching the sensitizing dyes after production of the image is complicated and not economically feasible.

It is an object of the present invention to develop a spectrally sensitized electrophotographic material in which the image recording layer is as far as possible colourless and the sensitivity of which remains stable in storage.

According to the invention there is provided an electrophotographic recording material comprising at least one photoconductive layer on a layer support, the photoconductive layer comprising a sensitizing dye represented by one of the following general formulae I to III:

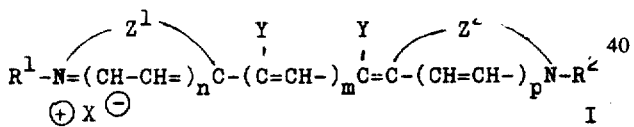

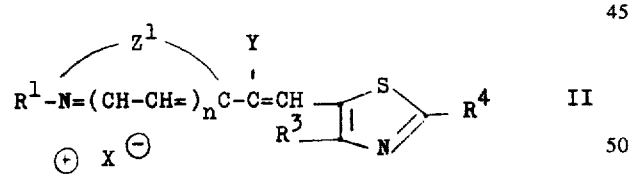

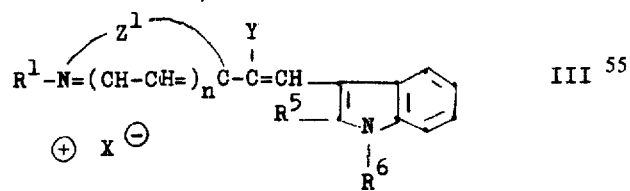

in which

Y is either (1) a nitrile group, (2) a nitro group or (3) a hydrogen atom and at least 1 of the Y atoms must not be a hydrogen atom;

$R^1$, $R^2$ is (1) a saturated or unsaturated aliphatic group which preferably contains up to 6 carbon atoms and which may be substituted, e.g., with phenyl, hydroxyl or a halogen such as fluorine, chlorine or bromine, carboxyl, esterified carboxyl, carbamoyl, sulfonic acid or esterified sulfonic acid, (2) a cycloalkyl group such as a cyclohexyl group or (3) an aryl group, in particular a phenyl group, which may be substituted;

$R^3$ is (1) a hydrogen atom, (2) a saturated or unsaturated aliphatic group preferably containing up to 3 carbon atoms, for example methyl, ethyl or (3) an aryl group, e.g., phenyl;

$R^4$ is the group $SR^7$ or $NR^8R^9$;

$R^5$ is a phenyl group which may be substituted with an alkyl group such as methyl or ethyl, with an aryl group such as phenyl, with an alkoxy group such as methoxy or ethoxy or with a halogen such as chlorine or bromine, these substituents being preferably in the p-position;

$R^6$ is a saturated or unsaturated aliphatic group perferably containing up to 6 carbon atoms, for example methyl, ethyl or an aryl group, for example phenyl which may be substituted for example with alkyl;

$R^7, R^8, R^9$ is a saturated or unsaturated aliphatic group preferably containing up to 6 carbon atoms, for example methyl, ethyl or an aryl group, for example phenyl;

$R^8$, $R^9$ may also together denote the ring members required to complete a heterocyclic ring, e.g., to complete a pyrrolidine, piperidine, morpholine or thiomorpholine ring or an indoline or tetrahydroquinoline ring;

$n$ is 0 or 1;

$m$ is 0, 1, 2 or 3, preferably 1 or 2;

$p$ is 0 or 1;

$X^-$ is any anion, e.g., a halide such as chloride, bromide or iodide, perchlorate, sulfate, metheylsulfate, p-toluenesulfonate and the like;

$Z^1$, $Z^2$ are the ring members required to complete a 5-membered or 6-membered heterocyclic ring; the heterocyclic group may contain a condensed benzene or naphthalene ring and other substituents; suitable heterocyclic groups are those commonly used in cyanine chemistry, for example those based on thiazole (e.g. thiazole, 4-methylthiazole, 5-methylthiazole, 4,5-dimethylthiazole, 4-phenylthiazole, 5-phenylthiazole, 4,5-diphenylthiazole, etc.), benzothiazole (e.g. benzothiazole, 4-chlorobenzothiazole, 5-chlorobenzothiazole, 6-chlorobenzothiazole, 7-chlorobenzothiazole, 6-bromobenzothiazole, 5-iodobenzothiazole, 6-iodobenzothiazole, 4-methylbenzothiazole, 5-methylbenzothiazole, 6-methylbenzothiazole, 5,6-dimethylbenzothiazole, 4-phenylbenzothiazole, 5-phenylbenzothiazole, 6-phenylbenzothiazole, 5-hydroxybenzothiazole, 6-hydroxybenzothiazole, 4-methoxybenzothiazole, 5-methoxybenzothiazole, 6-methoxybenzothiazole, 5-ethoxybenzothiazole, 6-ethoxybenzothiazole, 5,6-dimethoxybenzothiazole, 5,6-methylene-dihydroxybenzothiazole, 5-diethylaminobenzothiazole, 6-diethylaminobenzothiazole, 6-nitrobenzothiazole, 5-carboxybenzothiazole, 5-sulfobenzothiazole, 6-cyanobenzothiazole, 5-trifluoromethyl-5-benzoylbenzothiazole, tetrahydrobenzothiazole, 7-oxotetrahydrobenzothiazole, etc.), naphthothiazole (e.g. naphtho-[1,2-d]thiazole, naphtho[2,1-d]thiazole, 7-methoxynaphtho[2,1-d]thiazole, 8- methoxynaphtho[1,2-d]thiazole, etc.), selenazole (e.g. 4-methylselenazole or 4-phenyl selenazole), benzoselenazole (e.g. benzoselenazole, 5-chlorobenzoselenazole, 5,6-dimethylbenzoselenazole, 5-hydroxybenzoselenazole, methoxybenzoselenazole, tetrahydrobenzoselenazole, etc.), naphthoselenazole (e.g. naphtho[1,2-d]selenazole or naphtho[2,1-d]selenazole), oxazole (e.g. oxazole, 4-methyloxazole, 4-phenyloxazole, 4,5-diphenyloxazole, etc.), benzoxazole (e.g. benzoxazole, 5-chlorobenzoxazole, 6-chlorobenzoxazole, 5,6-dimethylbenzoxazole, 5-phenylbenzoxazole, 5-hydroxybenzoxazole, 5-methoxybenzoxazole, 5-phenylbenzoxazole, 5-hydroxybenzoxazole, 5-methoxybenzoxazole, 5-ethoxybenzoxazole, 6-dialkylaminobenzoxazole, 5-carboxybenzoxazole, 5-sulfobenzoxazole, sulfonamidobenzoxazole, 5-carboxyvinylbenzoxazole, etc.), naphthoxazole (e.g. naphtho[1,2-d]-oxazole, naphtho[2,1-d]oxazole or naphtho[2,3-d]oxazole), those of the 3,3-dialkylindolenine series (e.g. 3,3-dimethylindolenine, 3,3,5-trimethylindolenine, 3,3-dimethyl-5-methoxyindolenine, etc.), 2-pyridine (e.g. pyridine, 3-methylpyridine, 4-methylpyridine, 5-methylpyridine, 6-methylpyridine, 3,4-dimethylpyridine, 3,5-dimethylpyridine, 3,6-dimethylpyridine, 4,5-dimethylpyridine, 4,6-dimethylpyridine, 4-chloropyridine, 5-chloropyridine, 6-chloropyridine, 3-hydroxypyridine, 4-hydroxypyridine, 5-hydroxypyridine, 3-phenylpyridine, 4-phenylpyridine, 6-phenylpyridine, etc.), 4-pyridine (e.g. 2-methylpyridine, 3-methylpyridine, 2,3-dimethylpyridine, 2,5-dimethylpyridine, 2,6-dimethylpyridine, 2-chloropyridine, 3-chloropyridine, 2-hydroxypyridine, 3-hydroxypyridine, etc.), 2-quinoline (e.g. quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline, 5-oxo-5,6,7,8-tetrahydroquinoline, etc.), 4-quinoline (e.g. quinoline, 6-methoxyquinoline, 7-methylquinoline, 8-methylquinoline, etc.), isoquinoline (e.g. isoquinoline or 3,4-dihydroisoquinoline), thiazoline (e.g. thiazoline, 4-methylthiazoline, etc.) and those based on pyrroline, tetrahydropyridine, thiazdiazole, triazole, tetrazole, oxazoline, oxadiazole, pyrimidine, triazine, benzothiazine, pyrimidone or thiopyrimidone. The aryl groups and heterocyclic groups may in turn be substituted with any substituents, e.g. with alkyl groups, preferably those containing up to 3 carbon atoms such as methyl or ethyl, with halogen such as chlorine or bromine, hydroxyl, alkoxy groups, preferably those containing up to 3 carbon atoms such as methoxy or ethoxy, hydroxyalkyl, alkylthio, aryl such as phenyl or aralkyl such as benzyl, amino, sbustituted amino, nitro and the like.

The following formulae represent examples of suitable sensitizers:

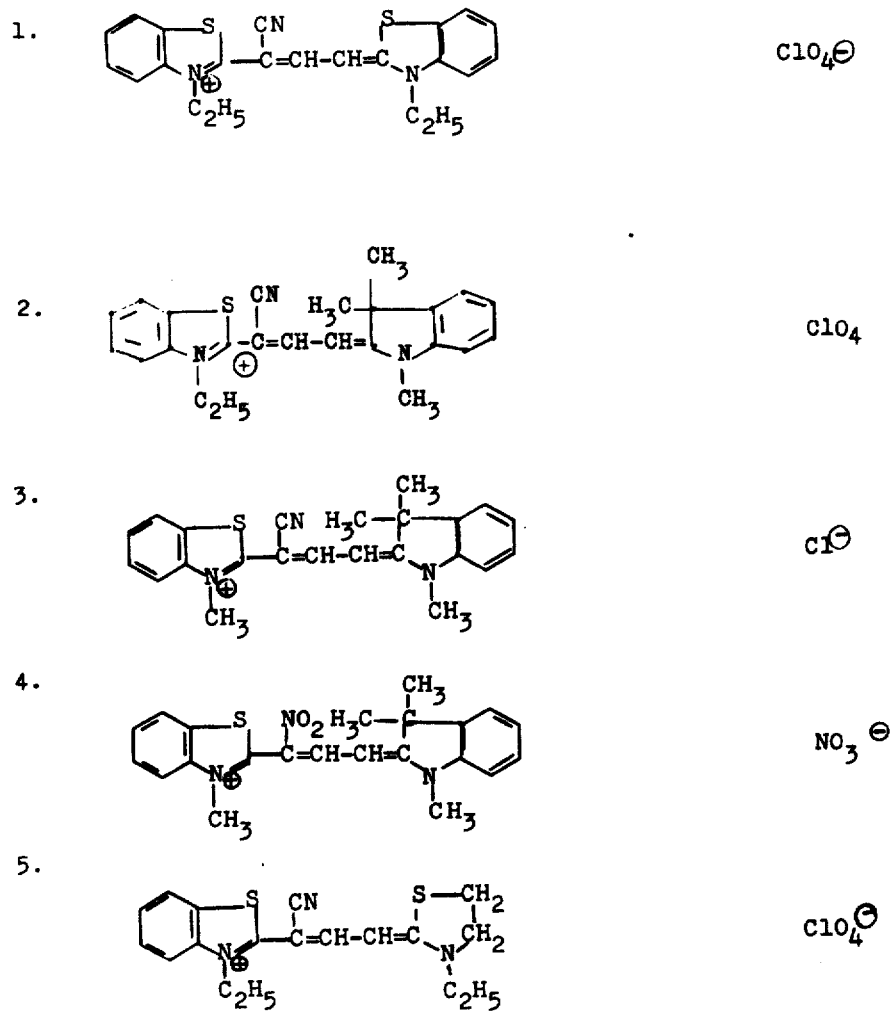

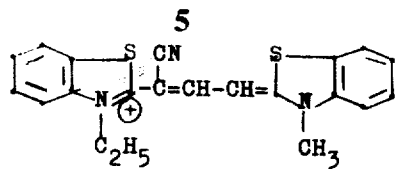 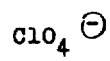
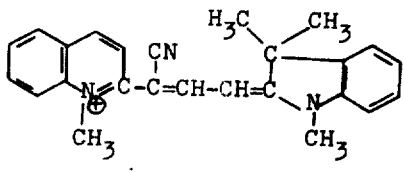 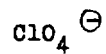
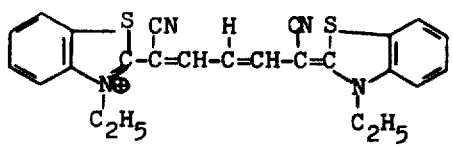 J$^\ominus$
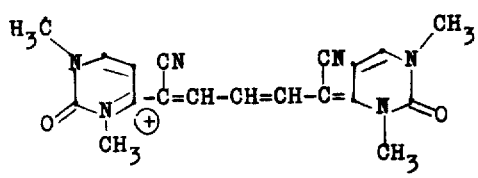 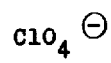
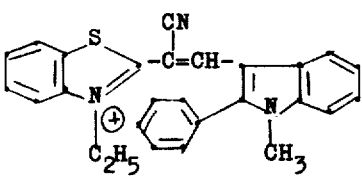 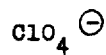
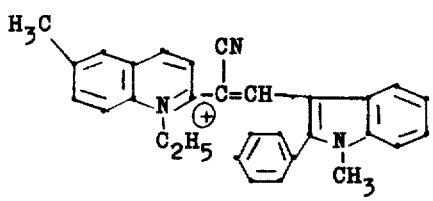 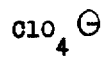
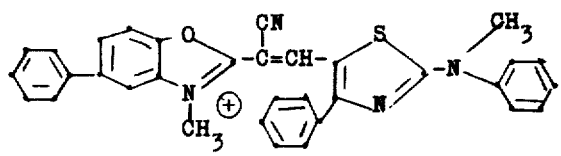 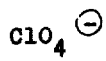
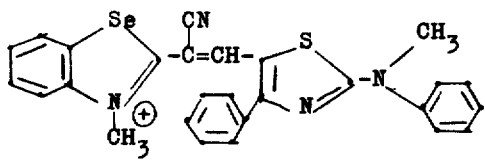 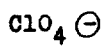
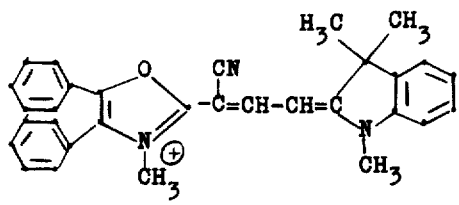 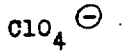

15. 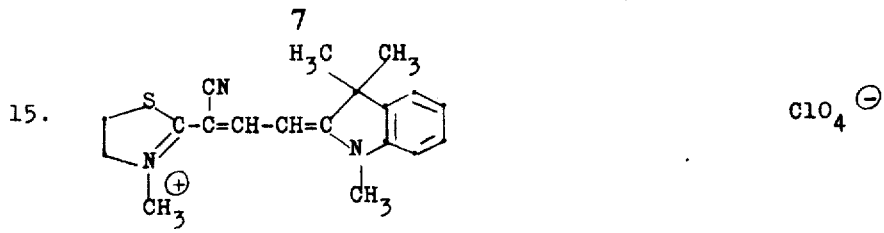 ClO$_4^\ominus$
16. 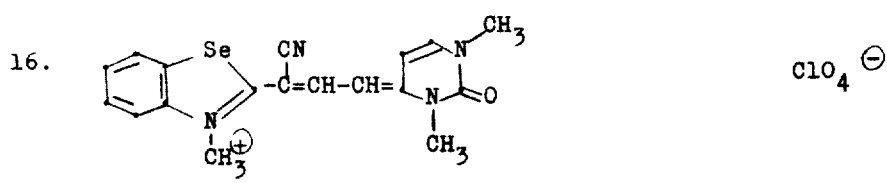 ClO$_4^\ominus$
17. 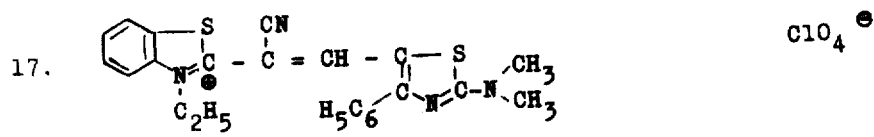 ClO$_4^\ominus$
18. 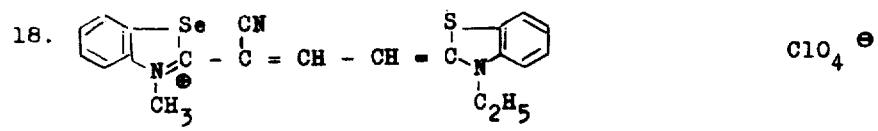 ClO$_4^\ominus$
19. 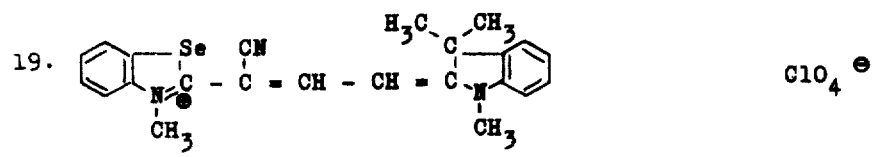 ClO$_4^\ominus$
20. 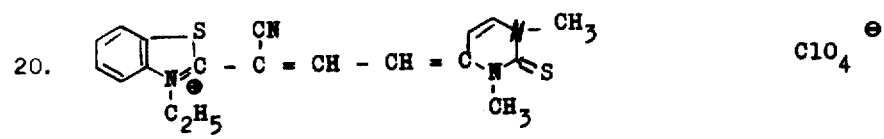 ClO$_4^\ominus$
21. 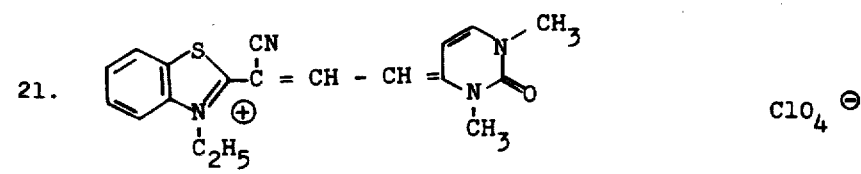 ClO$_4^\ominus$
22. 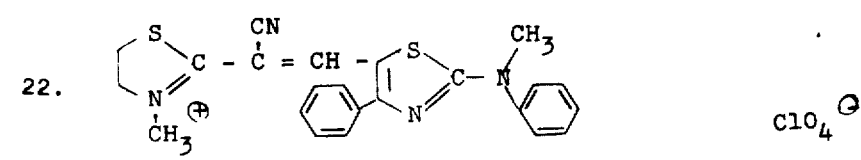 ClO$_4^\ominus$
23. 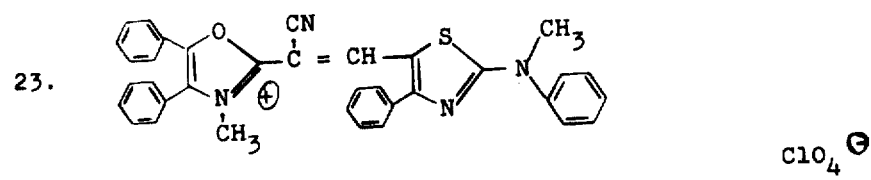 ClO$_4^\ominus$ 24. 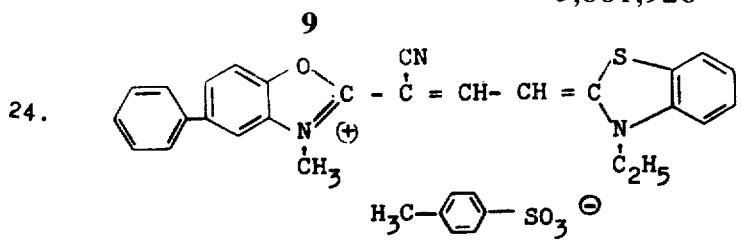
25. 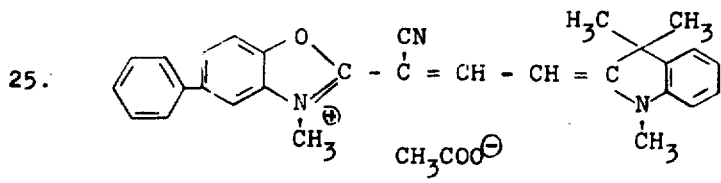
26. 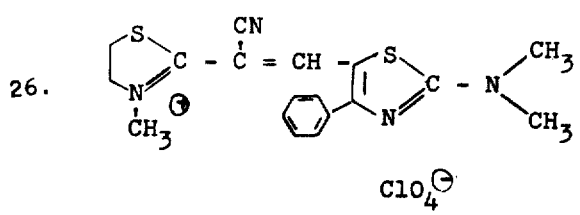
27. 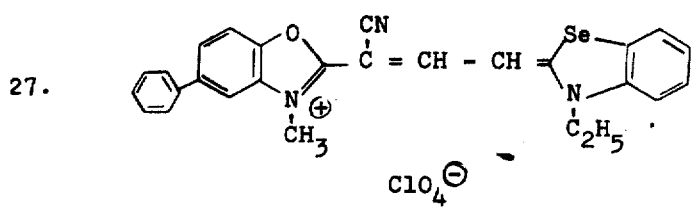
28. 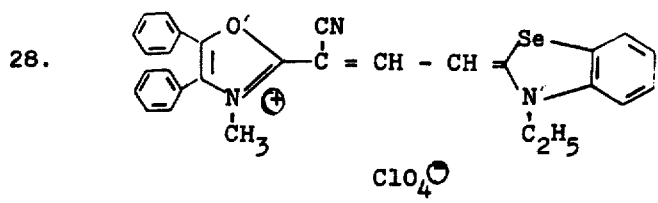
29. 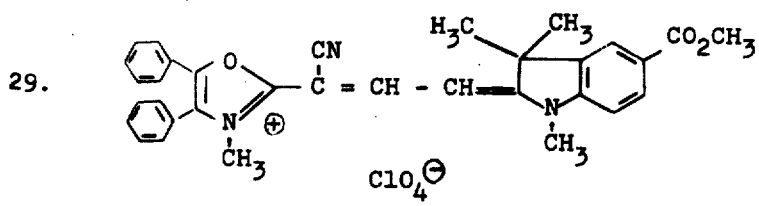
30. 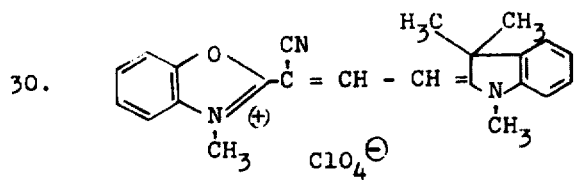
31. 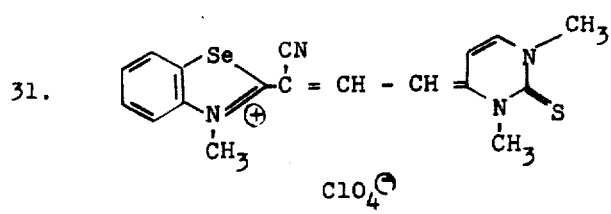

32. 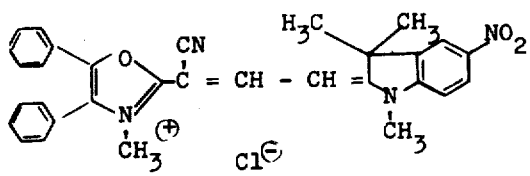

33. 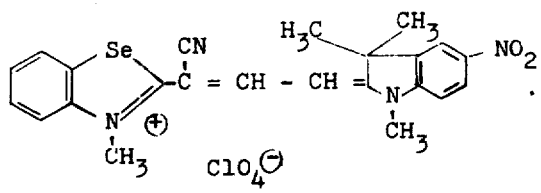

34. 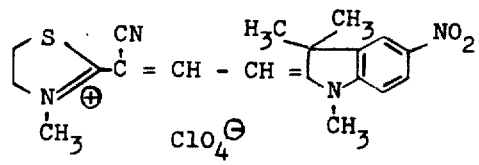

The dyes according to the invention may be prepared by known methods. Reference is made to the paper by BEATTIE et al., *J. Chem. Soc.* 1932, 260, U.S. Pat. No. Spec. 2,393,743 and British patent specification No. 620,801. α-Substituted trimethine cyanines of the Formula I may easily be obtained by condensation of the correspondingly substituted methylene compounds of Formula IV in which Y, $R^1$, $n$ and $Z^1$ have the meanings already indicated above with acetanilido compounds of Formula V in which $Z^2$, $R^2$, $p$ and $X^-$ have the meanings indicated above.

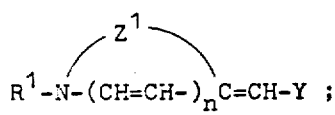

IV

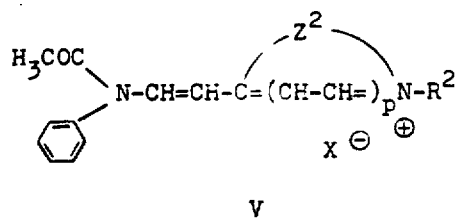

V

The reaction may be carried out at temperatures of from about 15°C up to the reflux temperature of the mixture, preferably using the reactants in equimolar or almost equimolar proportions. It may be carried out with or without a condensing agent, for example a trialkyl amine, in an inert solvent, for example acetic anhydride or an alkanol such as ethanol.

The α-substituted compounds of Formulae II and III are obtained in corresponding manner by condensation of an aldehyde of Formula VI or VII in which $R^3$, $R^4$, $R^5$ and $R^6$ have the meanings already indicated with a methylene compound of Formula IV with the addition of at least one mol of an acid such as acetic acid. Condensation may also advantageously be carried out in glacial acetic acid with the addition of a condensing agent such as phosphorus oxychloride. The thiazole aldehydes of Formula VI are easily obtained from the corresponding thiazoles by the Vilsmeier reaction as described in German Patent Specification Nos. 1,137,024 and 1,147,584.

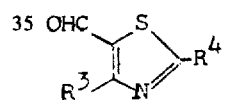

VI

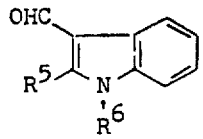

VII

The preparation of Dyes 21 and 22 ais described in detail below.

Dye 21

1.0 g of 2-cyanomethylene-3-ethyl-benzothiazole and 1.7 g of 4-acetanilidovinyl-1,3-dimethyl-pyrimidone-2-perchlorate in 10 ml of acetic anhydride are heated to reflux for 10 minutes. The dye precipitates on boiling. The mixture is cooled and the dye is suction filtered and recrystallised from methanol. 1.4 g, m.p.: 268°–269°C, absorption maximum 525 nm (in acetone).

Dye 22

2.0 g of 2-cyanomethylene-3-methyl-thiazole and 2.9 g of 2-methyl-phenylamino-4-phenyl-thiazole aldehyde-5in 10 ml of glacial acetic acid to which 2 ml of phosphorus oxychloride have been added are heated on a steam bath for 5 minutes. The mixture is then cooled and the dye is precipitated with sodium perchlorate solution, suction filtered and recrystallised twice from 75 ml portions of glacial acetic acid. 3.4 g, m.p.: 188°C, absorption maximum 493 nm (in methanol).

The dyes according to the invention are particularly suitable for the spectral sensitization of inorganic photoconductors dispersed in binders, particularly zinc oxide, and of organic photoconductors. The binders used for this process may be any of the usual film-forming binders used in electrophotography such as silicone resins, alkyd resins, polyurethanes or polyvinyl acetate.

The dyes are generally added in the form of solutions to the dispersions of inorganic or solutions of organic photoconductive substances which are to be sensitized. The methods used are familiar to the expert.

The sensitizing dyes may be added in the usual manner to the coating liquid used for producing the photoconductive layer. The optimum quantity of sensitizing dye to be used can be determined by simple tests and is generally in the region of 0.01 to 20 mg of dye per gram of photoconductor.

The electrophotographic recording material according to the invention may be prepared not only with the usual known inorganic photoconductors such as zinc oxide but also with known organic photoconductors.

The usual binders may be used for preparing the photoconductive layers or, if suitable organic photoconductors are used, image recording layers which are free from binder may be prepared in known manner.

The ratio of photoconductive substance to binder may vary within wide limits and depends both on the purpose for which the recording material is to be used and on the nature of the photoconductor. For zinc oxide, for example, satisfactory results are obtained by using a ratio of 1 part by weight of photoconductor to 0.1 – 2.0 parts by weight of binder.

In addition to the dyes according to the invention, the photoconductive substances and the binders, the photoconductive layers may also contain other spectral sensitizers (see e.g. British Pat. No. 1,020,504) as well as substances for adjusting the viscosity, age resistors, pigments (see British Pat. No. 1,007,349) or substances of the kind described in Belgian Pat. No. 612,102.

The photoconductive materials according to the invention may be used for the usual electrophotographic processes, for example for development processes which are carried out using a solid toner in the form of a loose powder, aerosol development processes, electrophoretic processes, so-called wetting development processes and the like. The materials according to the invention are suitable both for processing electrostatic images and for processing conductivity images.

EXAMPLE 1

100 mg of dye in the form of a 0.1% solution in dimethylformamide are added in each case to a mixture of 20 g of photoconductive zinc oxide, 20 ml of toluene, 11 ml of ethyl acetate, 0.66 ml of a 10% solution of tetrachlorophthalic anhydride in alcohol and 4.5 g of a 50% solution of a copolymer of vinyl acetate, acrylic acid ester and acrylic acid (% by weight 87 : 12 : 1) in a mixture of toluene, 1,2-dichloroethane and ethyl acetate (% by volume 1 : 1 : 4). The mixture is applied to a baryta paper support (25 g of zinc oxide per m²) and dried. The resulting electrophotographic material is charged and then exposed for 15 seconds to 2280 Lux from a 450 Watt incandescent lamp behind a step wedge (density difference 0.1) and then developed by a conventional development process using a toner powder. The sensitivity of the layers is assessed from the number of steps at which no toner particles are deposited and at which therefore the original density of the material is preserved. The greater the number of steps, the higher is the sensitivity.

The dye used for comparison is the known sensitizer Rhodamine B (Colour Index 45 170).

Table 1

| Dye | Sensitization maximum (nm) | Steps |
| --- | --- | --- |
| none | — | 14 |
| Rhodamine B | 555 | 24 |
| 1 | 530 | 25 |
| 2 | 535 | 24 |
| 3 | 540 | 24 |
| 6 | 530 | 26 |
| 9 | 630 | 25 |
| 16 | 540 | 26 |
| 18 | 535 | 25 |
| 19 | 535 | 25 |
| 20 | 545 | 26 |
| 21 | 545 | 26 |
| 24 | 505 | 24 |
| 28 | 530 | 24 |
| 31 | 560 | 25 |

EXAMPLE 2

A solution using in each case 0.05 g of dye and 4 g of 1-ethyl-3-phenyl-7-diethylamino-1-(1H)-quinoline in a mixture of 50 ml of methylene chloride and 50 ml of acetone is applied to an aluminium coated papere in such a way that the layer contains 2 g of photoconductor per m² when dry.

Each sample is negatively charged by means of a corona discharge at a potential difference of 6,000 V and then exposed behind a step wedge (density difference 0.2) to 2,000 Lux from an incandescent lamp at a distance of 25 cm for 15 seconds. The latent image is developed electrophoretically using as developer a 15/1000 dilution in Shellsol T (Trade name of a hydrocarbon mixture) of the following concentrated developer solution:

| | |
| --- | --- |
| Carbon black (average diameter 20 nm) | 30 g |
| Zinc monotridecyl phosphate | 1.5 g |
| Shellsol T (Trade name) | 750 ml |
| Binder solution | 150 g |

The solution of binder is prepared by heating 500 g of Alkydal L 67 (Trade name of Farbenfabriken Bayer AG. for an alkyd resin solution) in 500 ml of ligroin to 60°C until a clear solution is obtained and then cooling the solution. Relative sensitivity values are obtained by comparing the number of visible steps of the sensitized material with the number of visible steps of the unsensitized material, taking the relative sensitivity of the unsensitized material to be equal to 100.

Table 2

| Dye | Relative sensitivity |
| --- | --- |
| none | 100 |
| Rhodamine B | 2500 |
| 2 | 2500 |
| 3 | 2000 |
| 5 | 2500 |
| 7 | 2500 |
| 8 | 1600 |
| 10 | 2500 |
| 11 | 2500 |
| 12 | 2500 |
| 13 | 2500 |
| 14 | 2500 |
| 15 | 1600 |
| 17 | 2500 |

Table 2 — Continued

| Dye | Relative sensitivity |
|---|---|
| 19 | 2500 |
| 21 | 3400 |
| 22 | 1600 |
| 23 | 2500 |
| 25 | 2500 |
| 29 | 2500 |
| 30 | 1600 |
| 32 | 2500 |
| 33 | 1600 |

EXAMPLE 3

Mixtures are prepared in each case from 6 g of the photoconductor, 4 g of a copolymer of vinyl chloride, vinyl acetate and maleic acid anhydride (molar ratio 86.5 : 13.3 : 0.2), 0.05 g of sensitizing dye, 90 ml of 1,2-dichloroethane and 10 ml of methylene chloride. The photoconductor used is a compound of the following formula:

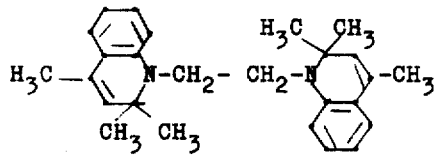

The mixtures are applied to an aluminium backed paper to produce layers which contain 3 g of photoconductor per m². The dry layers are negatively charged with a negative corona discharge at a potential difference of 6000 V, exposed behind a step wedge (density difference 0.2) to a 100 Watt incandescent lamp at a distance of 30 cm for 5 seconds and then developed as described in Example 2. The results obtained are summarised in the following Table.

Table 3

| Dye | Relative sensitivity |
|---|---|
| none | 60 |
| Rhodamine B | 1600 |
| 1 | 1600 |
| 4 | 1600 |
| 7 | 1600 |
| 10 | 1600 |
| 11 | 2500 |
| 12 | 1600 |
| 14 | 2500 |
| 16 | 1600 |
| 18 | 1600 |
| 19 | 1600 |
| 21 | 1600 |
| 23 | 2000 |
| 24 | 2500 |
| 25 | 2500 |

What is claimed is:

1. An electrophotographic recording material having a layer support and at least one sensitized photoconductive layer containing a photoconductor, a sensitizing dye, wherein the improvement comprises a photoconductor selected from the group consisting of zinc oxide, 1-ethyl-3-phenyl-7-diethylamino-2-(1H)-quinoline, the photoconductor compound of the following formula:

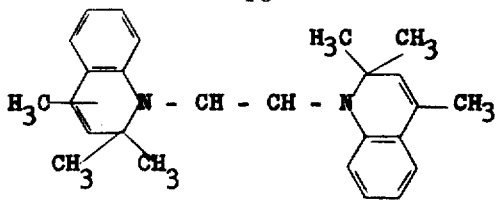

and in the photoconductor a sensitizing dye compound represented by one of the following formulae:

$$R^1-N=(CH-CH=)_n\overset{\oplus}{C}-(C=CH)_m C=C-(CH=CH-)_p N-R^2 \quad X^{\ominus} \qquad I$$

with $Z^1$, $Z^2$ rings and $Y$ substituents $$R^1-N=(CH-CH=)_n\overset{\oplus}{C}-C=CH\diagdown \overset{S}{\underset{R^3}{\diagup}}N\diagdown R^4 \quad X^{\ominus} \qquad II$$

with $Z^1$ ring and $Y$ substituent $$R^1-N=(CH-CH=)_n\overset{\oplus}{C}-C=CH\diagdown \overset{}{\underset{R^5}{\diagup}}N\diagdown \qquad III$$
$$X^{\ominus} \qquad R^6$$

with $Z^1$ ring and $Y$ substituent, fused benzene ring in which

Y is (1) a nitrile group, (2) a nitro group or (3) hydrogen; at least one of the groups Y having the meaning given as (1) or (2);

$R^1$, $R^2$ is a saturated or unsaturated aliphatic group which may be substituted with phenyl, hydroxyl, halogen, carboxyl, esterified carboxyl, carbamoyl, sulfonic acid or esterified sulfonic acid;

$R^3$ is hydrogen, a saturated or unsaturated aliphatic group or aryl;

$R^4$ is —$SR^7$ or $NR^8R^9$;

$R^5$ is a phenyl group which may be substituted with alkyl, aryl, alkoxy or halogen;

$R^6$ is a saturated or unsaturated aliphatic group;

$R^7$, $R^8$, $R^9$ is a saturated or unsaturated aliphatic group or an aryl group or $R^8$ and $R^9$ together denote the members required for completing a heterocyclic group containing a 5-membered or 6-membered heterocyclic ring;

$n$, $p$ are 0 or 1;

$m$ is 0, 1, 2 or 3;

$X^-$ is any anion;

$Z^1$, $Z^2$ are the ring members required to complete a 5- or 6-membered heterocyclic ring, which heterocyclic ring may contain a condensed benzene or naphthalene ring or other substituents.

2. An electrophotographic recording material according to claim 1, characterised in that it contains as photoconductor zinc oxide embedded in a binder.